US005581943A

United States Patent [19]
Deren et al.

[11] Patent Number: 5,581,943
[45] Date of Patent: Dec. 10, 1996

[54] TORQUE WINDOW

[75] Inventors: James M. Deren, Mishawaka, Ind.;
Darren M. Grumm, Cassopolis, Mich.

[73] Assignee: Excel Industries, Inc., Elkhart, Ind.

[21] Appl. No.: 451,895

[22] Filed: May 26, 1995

[51] Int. Cl.⁶ ................................................. E05F 11/24
[52] U.S. Cl. ............................... 49/339; 49/345; 464/38
[58] Field of Search ........................... 49/339, 341, 340, 49/345, 82.1; 464/38, 37

[56] References Cited

U.S. PATENT DOCUMENTS

| | | |
|---|---|---|
| 1,688,578 | 8/1923 | Feilcke . |
| 3,116,057 | 12/1963 | Fink .......................................... 49/341 |
| 3,934,370 | 1/1976 | Kwan et al. . |
| 3,981,067 | 9/1976 | Oiler . |
| 4,042,004 | 8/1977 | Kwan . |
| 4,233,781 | 11/1980 | Roe . |
| 4,721,492 | 1/1988 | Maurer ....................................... 464/38 |
| 4,889,175 | 12/1989 | Frey et al. . |

OTHER PUBLICATIONS

Alcraft Manufacturing Co., Mobile Home Window Hardware, 3 pages.
Deco Products Co., Mobile Home and Recreational Vehicle Hardware, Catalog 8, Apr. 1973, 3 pages.
Stanley Building Specialties Co., Aluminum Awning Windows, 1957, 8 pages.
The Yale & Towne Manufacturing Co., Window Hardware, 3 pages.
Blaine Window Hardware, Inc., Window Hardware, 1979–1980, 3 pages.

*Primary Examiner*—Philip C. Kannan
*Attorney, Agent, or Firm*—Banner & Witcoff, Ltd.

[57] ABSTRACT

An improved torque window assembly for motor vehicles has a peripheral frame defining an opening, and a moveable glazing pane pivotally mounted to the frame for movement about a pivot axis between an open and closed position. A torque handle is operatively connected to the glazing pane by a linkage assembly, including a torque bar which is rotatable about its longitudinal axis. A mounting assembly for the moveable glazing pane includes a hinge rail along a peripheral edge of the glazing pane. The hinge rail provides a U-shaped glazing channel to receive the peripheral edge of the glazing pane with a biased interference fit. The linkage from the torque bar to the hinge rail includes a one-piece hinge link having a substantially planar link section perpendicular to the hinge rail and two or more tabs received, one each, into U-shaped hinge channels extending axially along the hinge rail. In certain preferred embodiments, one or both ends of the torque bar carries a one-piece torque bar bushing having an end cap portion covering the end of the torque bar and a unitary link portion extending substantially perpendicular to the axis of the torque bar. The end cap portion of the one-piece torque bar bushing may be rotatably received in a bore of a torque bar support member mounted directly or indirectly to the frame. In certain preferred embodiments In certain preferred embodiments the torque handle forms a clutch assembly in which an inner disc is mounted for rotation in registry or synchrony with the torque bar and an outer hand-rotatable disc overlies the inner disc. The inner disc is rotatable in response to rotation of the outer disc up to a preselected torque level, after which the outer disc overruns the inner disc in either rotational direction.

14 Claims, 6 Drawing Sheets

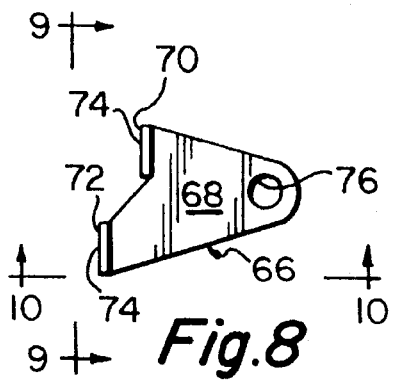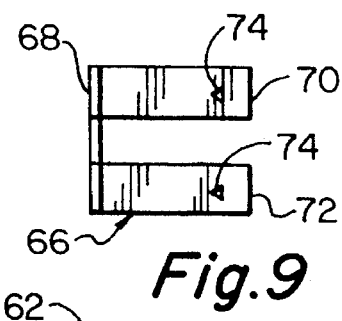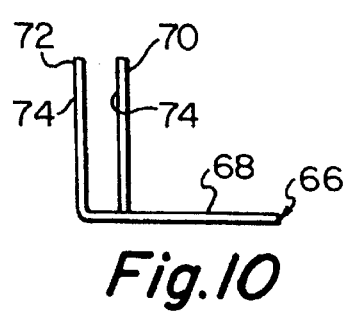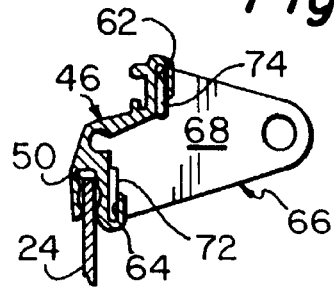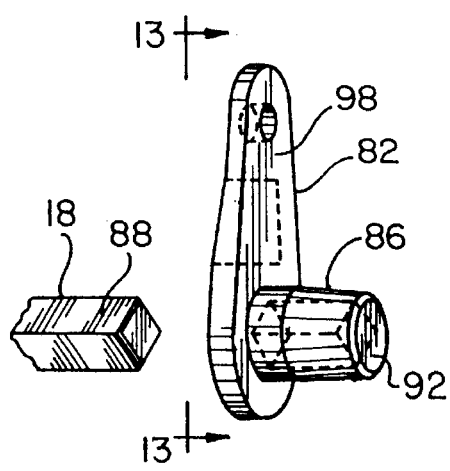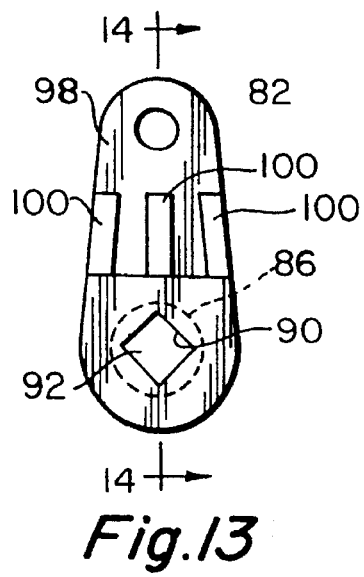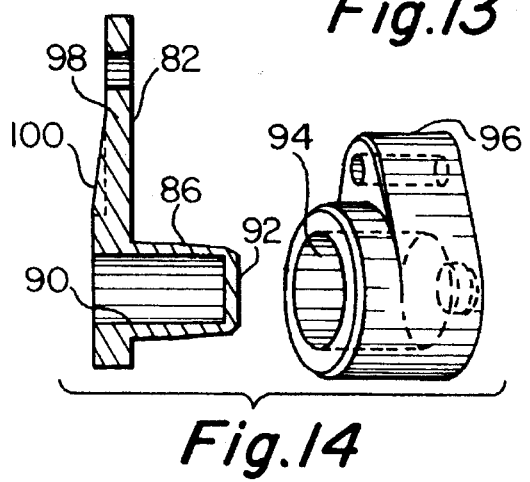

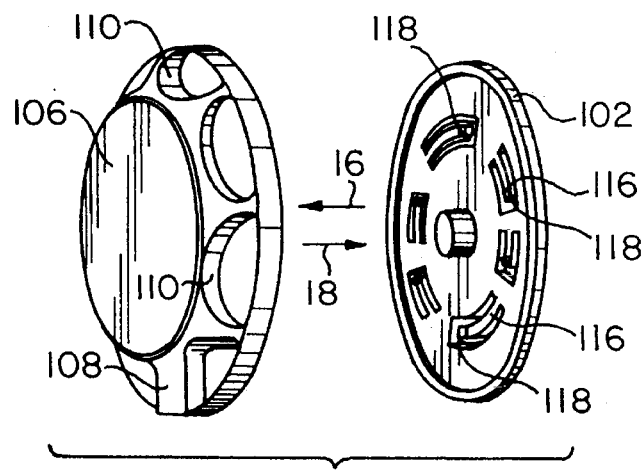
Fig.15
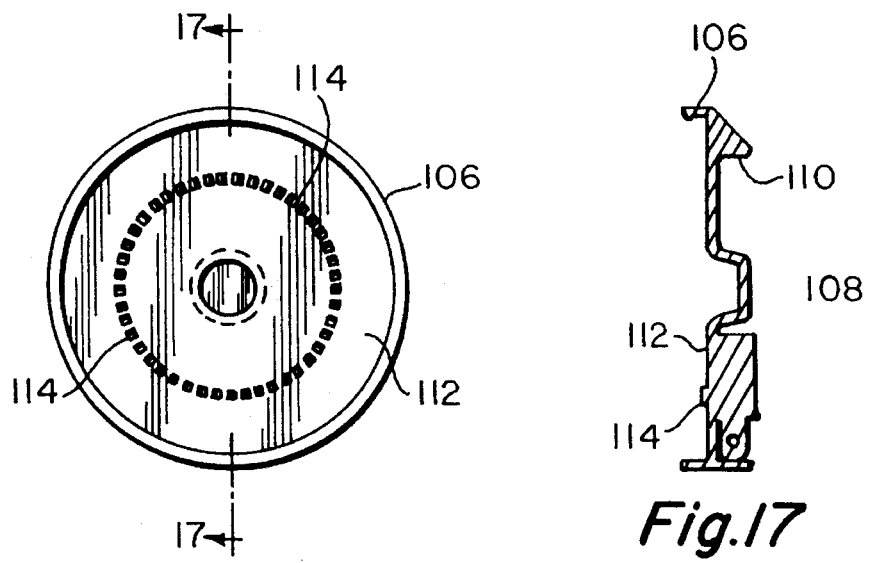
Fig.16
Fig.17
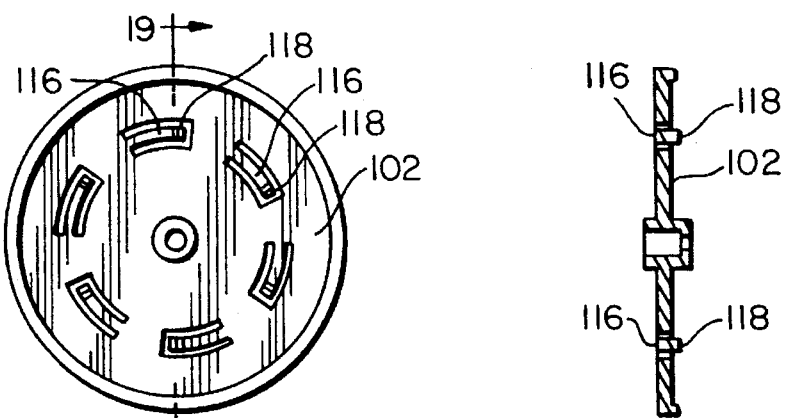
Fig.18
Fig.19

5,581,943

TORQUE WINDOW

INTRODUCTION

The present invention is directed to torque windows and, more particularly, to vehicle torque windows with certain operating component improvements.

BACKGROUND

Torque windows are well known, and have long been used in motor vehicles as an alternative to window assemblies in which a glazing pane can be opened by sliding in a vertical or horizontal plane. A torque window typically has a rotationally-operated handle, such as a crank arm or dial-type handle for opening and closing a louver pane, that is, a glazing pane which swings open and closed by pivoting about an axis in (or approximately in) the plane of the window. Frequently, the glazing pane is in a vertical plane when closed and swings open at its lower edge by pivoting about an axis at or near its upper horizontal edge. Along with the moveable glazing pane, torque windows optionally include one or more fixed position glazing panes. Additional moving panes also may be provided, operated by the same or separate individual torque handles.

The linkage componentry between the torque handle and the moveable glazing pane often is exposed to view and, particularly in a motor vehicle application, must be both aesthetically acceptable and sufficiently durable to withstand harsh operating environments. The same considerations apply to the mounting componentry for the moveable glazing pane. In general, therefore, improvements are desirable in such componentry to achieve better visual aesthetics, improved reliability, ease of repair, and/or simplicity of assembly.

In accordance with known designs, turning the torque handle is translated into axial rotation of a torque bar. Frequently the torque bar extends horizontally along a bottom horizontal portion of the window frame, between suitable mounting supports at opposite ends. Linkage elements are connected at one or both ends of the torque bar to translate torque bar rotation into pivotal opening or closing movement of the glazing pane. Most typically, the glazing pane opens and closes by pivoting about a horizontal axis at or near its upper peripheral edge, and the linkage means includes components extending vertically at both sides of the window from the torque bar up to the top of the glazing pane. The linkage and mounting componentry at the two opposite ends of the torque bar typically involves numerous components which increase design and assembly complexity and cost. In U.S. Pat. No. 4,889,175 to Frey et al, which is owned by the assignee of this invention, and the disclosure of which is incorporated herein by reference, a vertically-extending link slides over the end of the torque bar and is fixed in position by a suitable pin. The pin is mounted into a drilled hole or the like through the torque bar, axially inward of the link. Additionally, a separate bushing is mounted onto the torque bar between the link and a mounting support fixed to the peripheral frame of the window.

In the Frey et al torque window the linkage assembly includes a vertically-extending link bar on each side of the glazing pane. The upper end of each link bar is pivotally attached to a bracket (48) adhesively bonded to the surface of the glazing pane just below a hinge rail extending along the upper horizontal peripheral edge of the glazing pane. These brackets present a somewhat irregular surface along the perimeter surface of the glazing pane, with resultant complexity in achieving effective sealing when the glazing pane is in its closed position to exclude weather and wind noise. Other known designs require that one or more through-holes be drilled or otherwise formed through the moveable glazing pane for attachment of a linkage assembly member. Forming such through-holes can disadvantageously increase the cost and complexity of the manufacturing and assembly processes.

Accordingly, it is an object of the present invention to provide improved componentry for torque windows. It is a particular object to provide improved linkage or mounting componentry. Other objects of the invention will be apparent to those skilled in the art, that is, to those who are knowledgeable with respect to this area of technology and product design, in view of the following disclosure and description of the invention.

SUMMARY

In accordance with a first aspect, a vehicle torque window has a peripheral frame which defines an opening. A moveable glazing pane is pivotably mounted to the frame for movement about a pivot axis between an open and a closed position. A torque handle is provided for hand operation to pivot the glazing pane between its open and closed positions. Linkage means for operatively interconnecting the torque handle to the glazing pane includes a torque bar mounted for rotation about its longitudinal axis. The moveable glazing pane is pivotally mounted by a mounting assembly in which an elongate hinge rail forms an axially-extending U-shaped glazing channel receiving a peripheral edge of the glazing pane with an interference fit. More particularly, one or both legs of the U-shaped glazing channel is freestanding and sufficiently resilient that the channel exerts a clamping or pinching force against the opposite surfaces of the glazing pane. A pair of pivot pins, one at each lateral end of the hinge rail, can extend in the pivot axis of the glazing pane from the hinge rail to the peripheral frame. In accordance with a second aspect relating to certain preferred embodiments, a one-piece torque bar bushing is seated on the end of the torque bar, preferably one at each end. The one-piece torque bar bushing has an end cap portion covering the end of the torque bar and a link portion extending substantially perpendicular to the axis of the torque bar. The axial position of the link portion is properly fixed by the seating of the end cap portion on the end of the torque bar. Torque bars typically have a square or rectangular cross section, and the bore provided in the one-piece torque bar bushing can be correspondingly shaped, such that rotation of the torque bar translates into movement of the link section in an arc about the torque bar axis in accordance with known design objectives. Preferably, the bore provided in the one-piece torque bar bushing to receive the torque bar forms an interference fit with the torque bar, such that it can be assembled simply by being pushed onto the end of the torque bar. In addition, the exterior configuration of the end cap portion can advantageously be substantially cylindrical, such that it is suitable to be rotatably received within a cylindrical bore of a torque bar support mounted, either directly or indirectly, to the peripheral frame. The one-piece torque bar bushing is readily fabricated by low-cost manufacturing techniques including, for example, plastic injection molding. Preferably, two torque bar supports are used, one for each end of the torque bar, mounted to the vertical portions of the frame. It will be recognized by those who are skilled in the this area of technology that significant reduction in design and assembly complexity can be achieved over prior known torque windows by the linkage assembly comprising a hinge rail as described above and one-piece torque bar bushing.

In accordance with another aspect relating to certain preferred embodiments, the aforesaid hinge rail forms a pair of axially-extending U-shaped hinge channels open substantially toward each other. The linkage assembly interconnecting the torque bar to the glazing pane includes a hinge link having a substantially planar link section oriented in a plane substantially perpendicular to the hinge rail, and multiple tabs perpendicular to the planar link section. The tabs are received, one each, into corresponding hinge channels in the aforesaid hinge rail. Preferably, there are substantially symmetrical linkage subassemblies extending from each end of the torque bar, such that a hinge link as just described is employed at each end of the hinge rail.

In accordance with another aspect relating to certain preferred embodiments, the torque handle of a vehicle torque window provides a clutch assembly wherein an inner disc is mounted for rotation in registry or synchrony with the torque bar, that is, in substantially fixed rotational relation to the torque bar. An outer hand-rotatable disc overlies the inner disc, preferably having a snap-fit onto the inner disc. The inner disc is rotatable in either rotational direction by corresponding rotation of the outer disc. Beyond a preselected level of rotational torque, the outer disc is rotatable in overrunning fashion relative to the inner disc in either rotational direction. Thus, excessive force cannot be imposed on the glazing pane and the linkage interconnecting it to the torque bar and the inner disc of the torque handle. Damage is prevented, therefor, to the torque window componentry, due to excessive force being used on the torque handle. Those skilled in the art will recognize the potential for reduction in design and assembly complexity provided by the improved torque window componentry disclosed here. Additionally, improved operating performance and durability in the harsh motor vehicle environment can be achieved. Other features and advantages relating to the invention generally, or to certain preferred embodiments, will also be apparent from the detailed description below.

BRIEF DESCRIPTION OF THE DRAWINGS

The following detailed description of certain preferred embodiments will make reference to the accompanying drawings in which:

FIG. 8 is an enlarged side elevation view of a hinge link, taken out of assembly from the vehicle torque window of FIG. 1;

FIG. 9 is another view of the hinge link of FIG. 8, taken along line 9—9 of FIG. 8;

FIG. 10 is another view of the hinge link of FIG. 8, taken along line 10—10 of FIG. 1;

FIG. 11 is a perspective view of the hinge link of FIGS. 8–10 in assembly with the hinge rail of FIGS. 4–7;

FIG. 12 is an enlarged, perspective view of a torque bar bushing of the vehicle torque window of FIG. 1, with the torque bar thereof out of assembly;

FIG. 13 is an enlarged side elevation view of the torque bar bushing of FIG. 12, taken along line 13—13 of FIG. 12;

FIG. 14 is a section view of the torque bar bushing of FIGS. 12 and 13 taken through line 14—14 of FIG. 13, and showing mounting means;

FIG. 15 is an exploded, enlarged perspective view of the torque handle of the torque window of FIG. 1;

FIG. 16 is an elevation view of the inside face of the outer disc, that is, the cover plate, of the torque handle of FIG. 15, taken in the direction of arrow 16 in FIG. 15;

FIG. 17 is a section view taken through line 17—17 of FIG. 16;

FIG. 18 is an elevation view of the inside face of the inner disc, that is, the backplate, of the torque handle of FIG. 15, taken in the direction of arrow 18 in FIG. 15; and FIG. 19 is a section view taken through line 19—19 of FIG. 18.

It will be recognized by those skilled in the art that vehicle torque windows as here disclosed and described, can be used in various sizes. They may have one or more moveable panes, which can be operated by the same or separate torque handles. Optionally, such torque window assemblies may also have one or more fixed panes. For clarity and convenience of description, directional terms used herein should be understood to refer to a vehicle torque window mounted in a vertical plane, having a moveable pane which pivots at or near its upper horizontal peripheral edge, such that its horizontal lower peripheral edge swings away from and back toward a lower horizontal portion of the window frame to open and close the window. It should be understood, however, that numerous alterative orientations and designs are possible within the true scope and spirit of the invention.

DETAILED DESCRIPTION OF CERTAIN PREFERRED EMBODIMENTS

Figure 1:
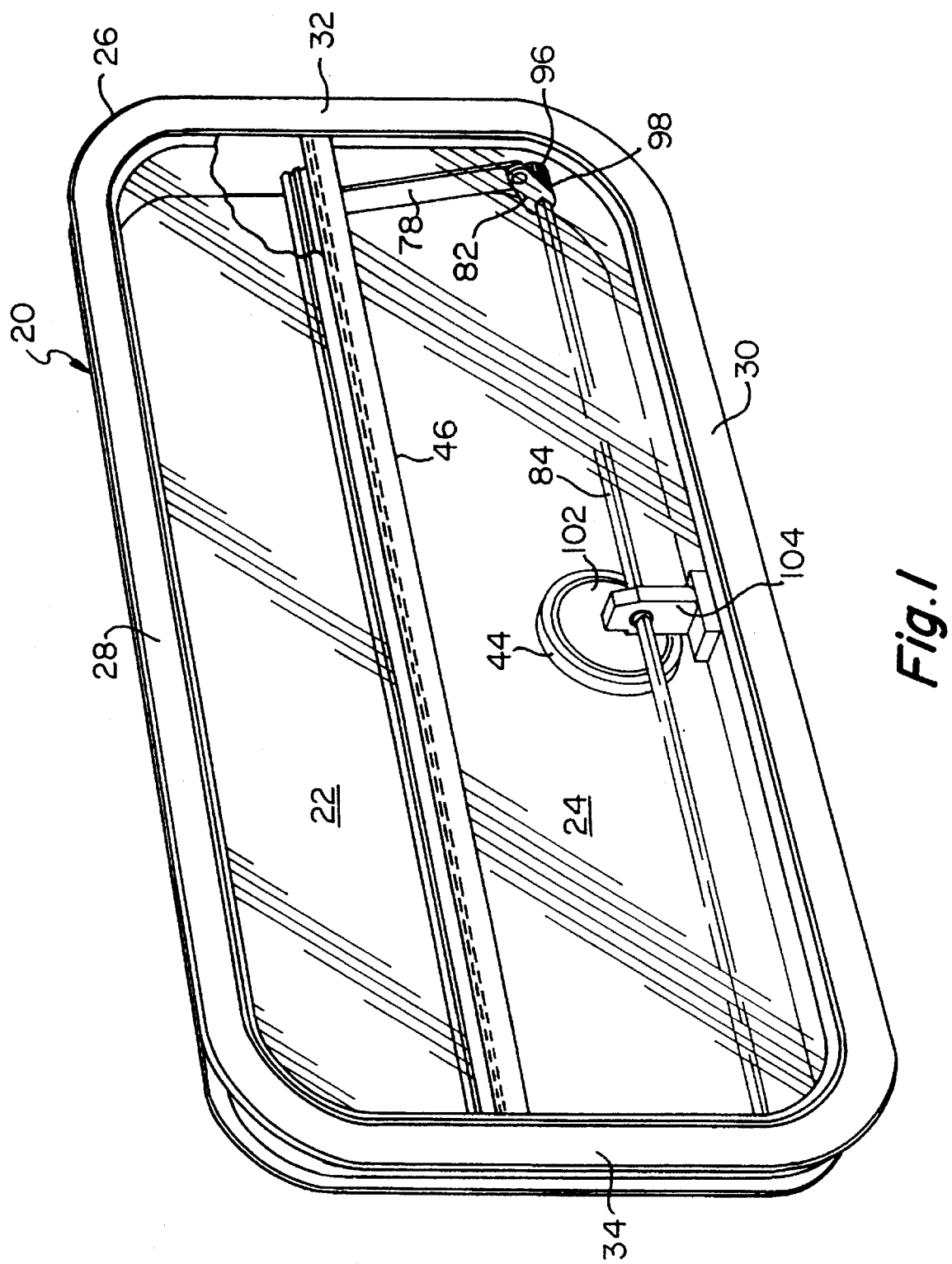
FIG. 1 is a perspective view of a vehicle torque window assembly in accordance with a first preferred embodiment.
Figure 2:
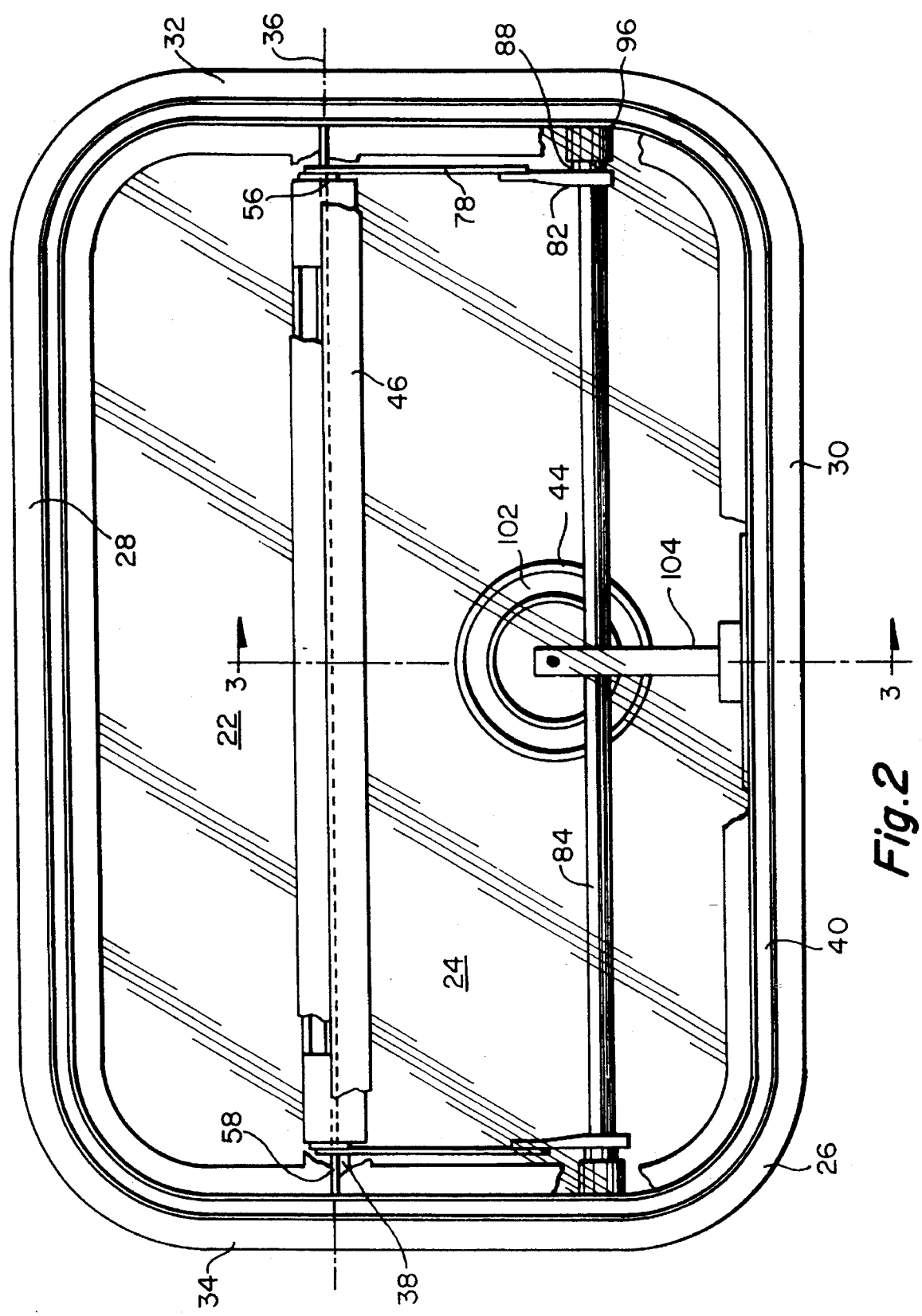
FIG. 2 is an elevation view of the vehicle torque window assembly of FIG. 1.
Figure 3:
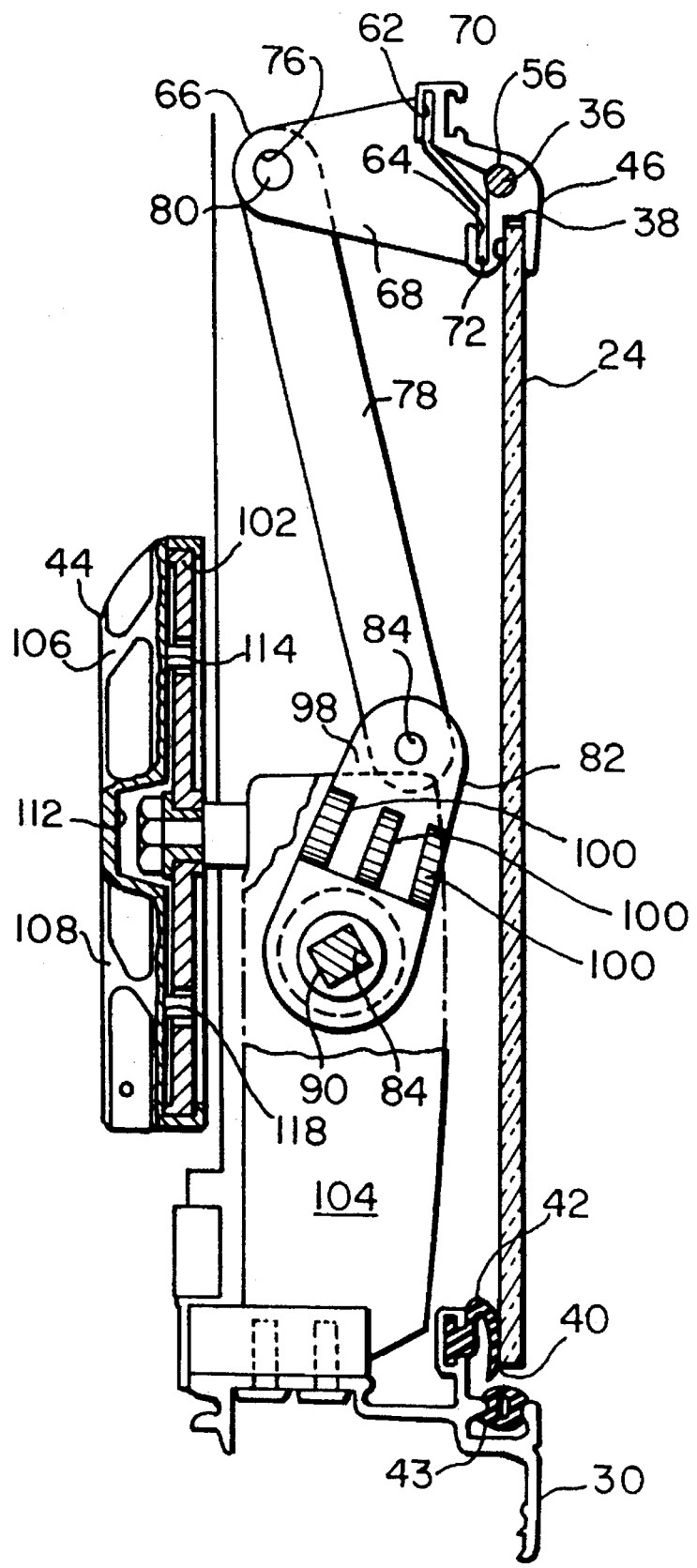
FIG. 3 is a section view taken through line 3—3 of FIG. 2.
Figure 4:
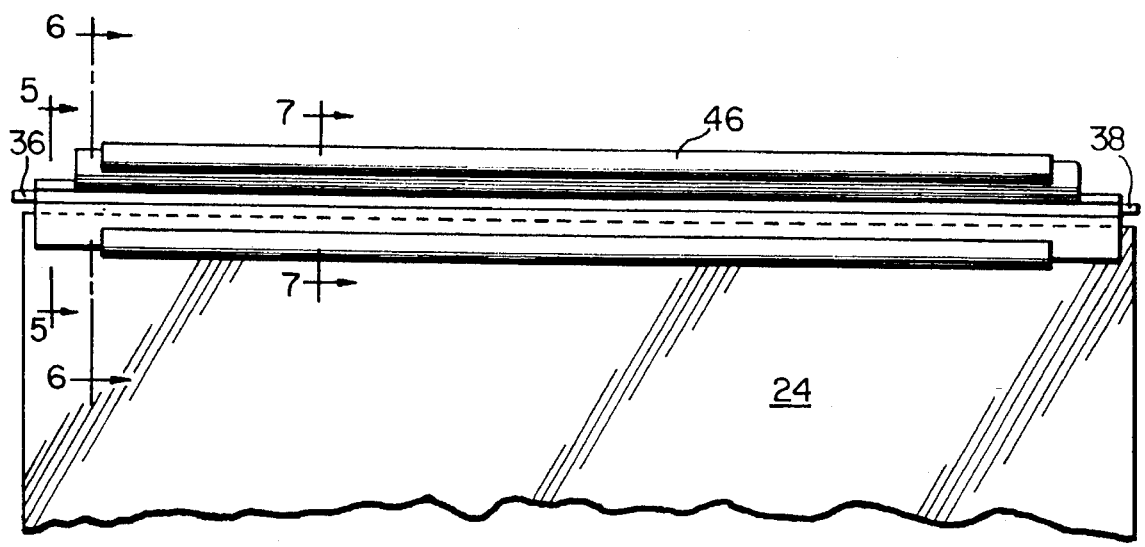
FIG. 4 is an enlarged detail view of the moveable pane and associated hinge rail of the vehicle torque window of FIG. 1.

An improved torque window in accordance with a preferred embodiment is illustrated in FIG. 1, being viewed from the outside as it would be mounted in a motor vehicle. The torque window 20 is seen to have an upper fixed glazing pane 22 and a lower moveable glazing pane 24, both mounted in a peripheral frame 26. Although the frame in accordance with this preferred embodiment extends as a unitary member about the complete circumferential periphery of the torque window assembly, reference will be made in this discussion to its various sections or portions, including upper horizontal portion 28, lower horizontal portion 30, right side vertically extending portion 32 and left side vertically extending portion 34. As best seen in FIGS. 2 and 3, the lower glazing pane 24 is moveable between an open and closed position by pivoting about a pivot axis 36 extending horizontally near the upper peripheral edge 38 of the glazing pane. The lower glazing pane is thus pivotally mounted to the peripheral frame 26 for movement about the pivot axis 36 between an open and closed position, substantially spanning the peripheral frame horizontally between the right side vertical portion 32 and left side vertical portion 34 of the frame. The lower peripheral edge 40 of the moveable glazing pane, in the closed position, seats along the lower horizontal portion 30 of the peripheral frame, preferably in conjunction with suitable elastomeric weather stripping 42, 43 or the like in accordance with design techniques well known to those skilled in the art.

Figure 5:
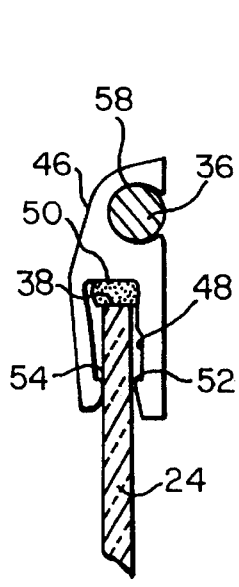
FIG. 5 is an enlarged section view taken through line 5—5 of FIG. 4.
Figure 6:
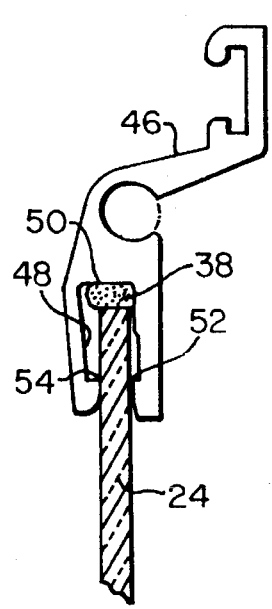
FIG. 6 is an enlarged section view taken through line 6—6 of FIG. 4.
Figure 7:
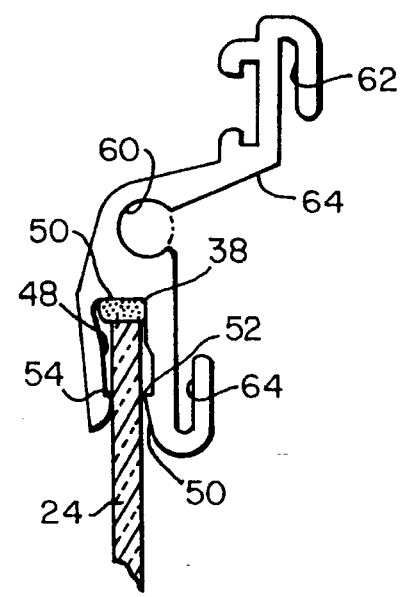
FIG. 7 is an enlarged section view taken through line 7—7 of FIG. 4.

The torque window is opened and closed by means of a torque handle 44 which can be operated by hand as discussed further below. Rotational force on the torque handle 44 is transmitted by linkage means to the mounting assembly for moveable glazing pane 24. The mounting assembly includes a horizontally extending hinge rail 46. In the preferred embodiment illustrated in the drawings, as best seen in FIGS. 3 through 7, the hinge rail forms a downwardly open, U-shaped glazing channel 48 which receives the upper peripheral edge 38 of the glazing pane 24. Optionally, a polyurethane or other suitable adhesive 50 is used within channel 38 for bonding glazing pane 24 to hinge rail 46. In accordance with a significant preferred aspect of this embodiment, however, the horizontally extending upper peripheral edge of the glazing pane 24 is received with an interference fit into U-shaped glazing channel 48. Preferably the hinge rail is formed, at least in the area of the glazing channel, of steel or other stiffly resilient material and the opening 50 of the glazing channel 48, in its relaxed or free state, is somewhat smaller than the width of the glazing pane 24. As best seen in FIGS. 5 through 7, the opening 50 of the glazing channel 48 is configured to have a beveled or ramped opening to facilitate insertion of the glazing pane, leading to contact edges 52, 54 which face each other and pinch glazing pane 24 between them. As seen in FIGS. 5 through 7, the hinge rail of the preferred embodiment is a single unitary member. Assembly of the moveable glazing pane with an interference fit into the glazing channel provides significant advantages over prior torque window arrangements, most notably reducing the design and assembly cost and complexity.

The hinge rail 46 is mounted to the peripheral frame 26 by a pair of pivot pins 56, 58. The pivot pins extend horizontally in opposite directions from the hinge rail to the vertical portions of the peripheral frame 26. Thus, pivot pin 56 extends from hinge rail 46 to vertical portion 32 of the frame, and pivot pin 58 extends horizontally in the opposite direction from hinge rail 46 to vertical portion 34 of the peripheral frame. As best seen in FIGS. 5 through 7, the one piece hinge rail 46 is configured to have a horizontally extending cylindrical bore 60 concentric with the pivot axis 36 to receive the pivot pins.

In accordance with a significant aspect of the preferred embodiments illustrated in the drawings, the hinge rail provides means for an easy to assemble interconnection to the linkage assembly by which torque is transferred from the torque handle 44 to the moveable glazing pane 24. Specifically, hinge rail 46 has a pair of axially extending U-shaped hinge channels 62, 64 which open substantially toward each other. Advantageously, such hinge channels are formed as unitary portions of the one-piece hinge rail. The hinge channels receive a hinge link component of the aforesaid linkage means. Specifically, as best seen in FIGS. 8 through 11, a hinge link 66 is formed with a substantially planar link section 68 and a pair of tabs 70, 72 which extend in a plane substantially at right angles to the plane of the link section 68. A right side and left side hinge link is used in the preferred embodiment illustrated. Since, however, the right and left sides of the linkage assembly are substantially identical or mirror image to each other, only the right side of the linkage assembly will be described in detail here. The tabs 70, 72 of the hinge link are inserted into the aforesaid hinge channels 62, 64 of the hinge rail. Thus, the tabs extend in the longitudinal direction of the hinge rail, while the planar link section 68 extends in a plane substantially perpendicular to the plane of moveable glazing pane 24. It will be appreciated that fewer or more tabs could be employed. The use of multiple tabs, particularly a pair of tabs which are vertically and laterally offset from each other as in the illustrated embodiment, is found to provide excellent durability and structural integrity, together with ease of assembly. Each of the tabs preferably has an upstanding tooth 74 or the like to aid in retaining the hinge link in fixed assembly with the hinge rail. The hinge link preferably is a one piece member, such that the planar link section 68 is unitary with the tabs 70, 72. The hinge link thus can be formed, for example, of stamped steel. Alternative materials and fabrication methods will be readily apparent to those skilled in the art in view of the present disclosure.

Further describing the linkage means of the preferred embodiment illustrated, hinge link 66 is seen to have a linking aperture 76 in the planar link section 68, whereby a vertical link bar 78 can be pivotally mounted to it by a suitable pin, bolt 80 or the like, as shown in FIG. 3. As best seen in FIG. 3, upward vertical travel of link bar 78 will result in closure of moveable glazing pane 24 while, correspondingly, downward movement of link bar 78 will result in moving the glazing pane to its open position (the bottom edge 40 of the moveable glazing pane arcing to the right as viewed in FIG. 3).

At its lower end the vertical link bar 78 is pivotally connected to a torque bar bushing 82 by a suitable pin 84 or the like. The torque bar bushing interconnects the horizontally extending torque bar 84 to the other components of the linkage means. More specifically, it translates rotation of torque bar 84 along its longitudinal axis into vertical movement of link bar 78 to open and close the window. In accordance with a particularly significant and advantageous aspect of the preferred embodiment illustrated, the torque bar bushing is a unitary, one-piece member, as now described in detail with reference especially to FIGS. 3 and 12 through 14. The one-piece torque bar bushing 82 seats on the end of the torque bar 84. More specifically, it has an end cap portion 86 which has a substantially cylindrical outside surface configuration. Within the end cap portion a bore is formed to receive the end 88 of the torque bar 84. Since the torque bar in the preferred embodiment has a substantially square cross section, the bore 90 within the end cap portion 86 is correspondingly square in its cross sectional configuration, as best seen in FIG. 13. Preferably, bore 90 of the torque bar bushing receives the end of the torque bar 84 with a friction or interference fit to provide ease of assembly, quiet operation and related advantages. The end cap portion can be open ended at both ends, or, more preferably, is closed by end wall 92 opposite the opening for the torque bar. The cylindrical outer configuration of the end cap portion 86 is rotatably received into a cylindrical bore 94 of a torque bar support 96 mounted to the peripheral frame.

Unitary with the end cap portion 86 is a substantially planar link portion 98. Link portion 98 extends in a plane substantially perpendicular to the longitudinal axis of the torque bar. As described above, rotation of the torque bar about its longitudinal axis is thereby translated by the one-piece torque bar bushing 82 into arcuate movement of the link portion 98 in a plane perpendicular to the moveable glazing pane 24. This, in turn, is translated into substantially vertical movement of link bar 78 to open and close the window.

The unitary torque bar bushing 82 can be formed of metal, for example, by casting or machining, or more preferably of nylon or other suitable plastic by injection molding or like fabrication technique. In accordance with the preferred embodiment illustrated, the torque bar bushing is strengthened by reenforcement ribs 100 which, again, are unitary with the other portions of the torque bar bushing 82. It will be recognized by those skilled in the art in view of this disclosure that substantial advantage can be achieved in reducing assembly cost and complexity, by means of the unitary one-piece torque bar bushing disclosed here.

As mentioned above, torque windows typically are opened and closed by means of a hand-operated torque handle of the crank arm type or circular disc type. In accordance with a significant aspect of the preferred embodiment illustrated and disclosed here, the torque handle comprises a clutch assembly to prevent damage to the torque handle itself, the linkage means, the mounting assembly and the moveable glazing pane. More specifically, the clutch assembly limits the amount of force which the operator can exert on the window assembly in opening and closing the window. In the preferred embodiment illustrated, the torque handle comprises an inner disc 102 which is mounted for rotation in substantially fixed relation with the torque bar 85. Inner disc 102 can be mounted by means of worm gear assembly 104 in accordance with known designs. Referring now especially to FIGS. 3 and 15 to 19, the torque handle is seen to further comprise an outer, hand-rotatable disc 106 which preferably is mounted with a snap fit onto the inner disc 102. The outside surface 108 of outer disc 106 provides recesses 110 about its outer circumferential periphery to provide finger hole locations for hand rotation thereof. The aforesaid clutch mechanism is provided preferably through the mechanism of a ramped interface between the outer disc and the inner disc. The preferred embodiment illustrated achieves such ramped interface by providing a circle of circumferentially-spaced teeth or nubs on the inside surface 112 of outer disc 106. The teeth 114 preferably have a beveled or rounded surface or the like. A correspondingly sized circle of circumferentially-spaced cantilevered beams 116 are provided by the inner disc 102. As best seen in FIGS. 18 and 19, the cantilevered beams 116 are free to flex or yield in the direction of the rotational axis 118 of the torque handle. Such flexure or yielding, however, is resisted by the preselected level of resiliency or stiffness of the cantilevered beams. At the free end of each of the cantilevered beams there preferably is an upstanding tooth or nub 118 having a beveled or rounded surface or the like, corresponding to the teeth 114 of the outer disc. The teeth 114 of the outer disc act against the teeth 118 of the inner disc to transmit rotational force from the outer disc to the inner disc. Thus, the two discs have a "ramped interface" in that one or both of the interference features, that is, the cantilevered beams and outer disc teeth, has a beveled or rounded surface or the like, such that the outer disc can overcome the interference and over-run the inner disc at excessive torque levels. It will be apparent to those skilled in the art in view of the present disclosure that the inner and outer discs of the torque handle are readily fabricated by injection molding techniques, although alternative methods and materials will be apparent. It will also be apparent in view of this disclosure that the ramped interference between the outer and inner disc of the torque handle to provide the aforesaid clutch mechanism can be accomplished in numerous alternative ways including, for example, switching the teeth and cantilevered beams to the opposite discs. Moreover, alternative clutch mechanisms can be employed, including alternative fixed or biased friction surfaces or other means by which the rotational torque of the outer disc is imparted to the inner disc only up to a preselected level.

Those who are skilled in this area of technology will recognize that various alterations and adaptations can be made to the preferred embodiments discussed above without departing from the true scope and spirit of the invention. All such adaptations and alterations are intended to be within the scope of the following claims.

We claim:

1. A vehicle torque window assembly comprising:

a peripheral frame which defines an opening;

a moveable glazing pane pivotally mounted to the frame for movement about a pivot axis between an open and a closed position by a mounting assembly comprising an elongate hinge rail attached to a peripheral edge of the glazing pane and forming at least one axially extending hinge channel;

a torque handle for rotation by hand to pivot the glazing pane between its open and closed positions; and linkage means for operatively interconnecting the torque handle and the glazing pane, comprising a hinge link having a substantially planar link section in a plane substantially perpendicular to the hinge rail, and at least one hinge tab, integral with the link section, received into a corresponding hinge channel.

2. The vehicle torque window assembly in accordance with claim 1 wherein the hinge rail forms a pair of said axially extending hinge channels which are U-shaped and open substantially toward each other, and the hinge link forms a pair of said hinge tabs which are unitary with the link section and received, one each, into corresponding ones of the hinge channels.

3. The vehicle torque window assembly in accordance with claim 1 wherein:

the linkage means further comprises a torque bar mounted for rotation about its longitudinal axis and a one-piece torque bar bushing having an end cap portion covering an end of the torque bar and a link portion unitary with the end cap portion and extending substantially perpendicular to the longitudinal axis of the torque bar.

4. The vehicle torque window assembly in accordance with claim 3 wherein the link portion of the torque bar bushing is axially inward of the end cap portion.

5. The vehicle torque window assembly in accordance with claim 3 wherein the torque bar bushing further comprises multiple unitary reinforcement ribs extending along the link means from the end cap means.

6. The vehicle torque window assembly in accordance with claim 3 wherein the end cap portion is substantially cylindrical, coaxial with the torque bar, and rotatably received in a cylindrical bore of a torque bar support mounted to the peripheral frame.

7. The vehicle torque window assembly in accordance with claim 3 wherein the linkage means further comprises a second one-piece torque bar bushing having an end cap portion covering a second end of the torque bar and a link portion unitary with the end cap portion of the second one-piece torque bar bushing, and extending substantially perpendicular to the longitudinal axis of the torque bar.

8. The vehicle torque window assembly in accordance with claim 1 wherein the glazing pane is pivotally mounted by a mounting assembly comprising:

an elongate hinge rail forming an axially extending U-shaped glazing channel receiving a peripheral edge of the glazing pane with an interference fit; and a pair of pivot pins extending in the pivot axis of the glazing pane from the hinge rail to the peripheral frame in opposite directions from one another.

9. The vehicle torque window assembly in accordance with claim 1 wherein the torque handle comprises a clutch assembly comprising:

an inner disc mounted for rotation in substantially fixed relation with the torque bar; and an outer hand-rotatable disc overlying the inner disc, the inner disc being rotatable in either rotational direction by rotation of the outer disc, and the outer disc being rotatable in over-running fashion relative the inner disc in either rotational direction at a rotational torque higher than said preselected level.

10. The vehicle torque window assembly in accordance with claim 9 wherein the outer disc is mounted with a snap-fit to the inner disc.

11. The vehicle torque window assembly in accordance with claim 9 wherein the inner disc is molded plastic and forms a series of unitary, circumferentially spaced, cantilevered beams, and the outer disc is molded plastic and forms a series of unitary, circumferentially spaced teeth extending axially into ramped interference with free ends of the cantilevered beams, rotational torque being transmitted from the outer disc to the inner disc up to the preselected level of rotational torque by said interference, and flexure of the cantilevered beams relieving said interference to permit the outer disc to overrun the inner disc at rotational torque higher than the preselected level.

12. The vehicle torque window assembly in accordance with claim 1 wherein the torque handle is substantially axially centered along the torque bar.

13. The vehicle torque window assembly in accordance with claim 1 further comprising another glazing pane mounted in fixed position to the peripheral frame.

14. A vehicle torque window assembly comprising:

A) a peripheral frame defining a window opening and having vertically spaced, horizontally extending upper and lower frame portions, and horizontally spaced, vertically extending right and left side frame portions;

B) a glazing pane pivotally mounted to the peripheral frame for movement about a pivot axis between an open and closed position, substantially spanning the peripheral frame horizontally between the right and left side frame portions, having a horizontally extending lower peripheral edge positioned along the lower frame portion in the closed position and a horizontally extending upper peripheral edge extending parallel to and proximate the pivot axis, being mounted by a mounting assembly comprising an elongate hinge rail forming (i) an axially extending, downwardly open U-shaped glazing channel receiving with an interference fit a horizontally extending upper peripheral edge of the glazing pane, and (ii) a pair of axially extending U-shaped hinge channels open substantially toward each other, and a pair of pivot pins extending from the hinge rail in opposite directions along the pivot axis to corresponding ones of the vertical side frame portions of the peripheral frame;

C) a torque handle for rotation by hand to move the glazing pane between its open and closed positions; and D) linkage means for operatively interconnecting the torque handle means to the glazing pane, comprising:

a torque bar extending between the right and left side portions of the peripheral frame, mounted for rotation about its longitudinal axis;

first and second one-piece torque bar bushings, each seated on a corresponding end of the torque bar and having a substantially cylindrical end cap portion coveting a respective end of the torque bar and rotatably received in a cylindrical bore of a torque bar support mounted to a corresponding side frame portion, and a substantially planar link portion unitary with the end cap portion and extending in a plane substantially perpendicular to the longitudinal axis of the torque bar; and a right side and left side hinge link each having (i) a substantially planar link section in a plane substantially perpendicular to the hinge rail and pivotally joined to another link member of the linkage means, and (ii) a pair of tabs received, one each, into corresponding ones of the hinge channels.

\* \* \* \* \*